United States Patent Office 3,104,979
Patented Sept. 24, 1963

3,104,979
HEAT ACTIVATABLE ADHESIVE COMPOSITIONS CONTAINING A CRYSTAL COMPLEX OF A LIQUID PLASTICIZER
William R. Lawton and Eugene F. Lopez, Nashua, N.H., assignors to Nashua Corporation, Nashua, N.H., a corporation of Massachusetts
No Drawing. Filed Sept. 17, 1959, Ser. No. 840,514
8 Claims. (Cl. 106—178)

This invention relates to adhesive compositions, particularly to compositions of the type described by Perry in U.S. Patent No. 2,462,029 which upon heat activation acquire a modified adhesive characteristic. The adhesive compositions described by Perry contain discrete solid particles of a plasticizer which are present in the potentially adhesive film. Heating the film to activate the adhesive causes the plasticizer to melt and merge with the thermoplastic polymeric components of the film and thereby alter its adhesive characteristics. Typically this merging of the plasticizer and polymeric material results in increased tack or viscidity, and also lowers the temperature at which the composition solidifies to a dry non-tacky film and, conversely, at which such dry film, after solidification, softens or activates upon a subsequent heating. The compositions of Perry have proved to be extremely useful in providing adhesive films and articles having such films, such as tapes and labels, which are dry and non-tacky at normal room and storage temperature conditions, but are heat activatable to adhesive tackiness and retain such adhesive tackiness when subsequently cooled to temperatures below their initial activation temperature. After initial activation these films may be allowed to cool to temperatures appreciably below the activation temperatures and can subsequently be applied to the desired surface. Heat need not, therefore, be maintained after the initial activation to keep the adhesive ready for use.

Compositions of the Perry type are limited to the use of solid crystalline plasticizers, which because of their solid nature prior to initial activation remain inert within the composition. The present invention comprises adhesive compositions which contain liquid plasticizers for the thermoplastic polymeric material, with the plasticizer present in a latent condition until activation occurs. The liquid component will generally be an ordinary conventional plasticizer for the particular polymeric material employed, but the term "plasticizer" is used herein in its broadest sense and includes other compatible liquids useful for modifying the properties of the thermoplastic or polymeric material. Such liquids are in general capable of merging with the polymeric material, as by dissolving, solvating, or similarly combining or mixing with it, and are collectively referred to herein as plasticizers on account of their common properties of softening or liquifying the polymeric material. Compatible liquids of relatively high volatility are considered to be within the scope of the term, although they may be thought of also as solvents.

The plasticizer component of the adhesive composition of this invention is rendered latent by being combined into a crystal complex which is stable at normal conditions, e.g. those encountered in manufacture, shipment, and storage prior to actual use, but dissociable at an elevated temperature or by the action of a solvent to release the plasticizer in active condition. Heating or moistening of the adhesive compositions causes dissociation of the complex thus making the plasticizer actively available to merge with the polymeric material and impart an enhanced tackiness or viscidity. These effects will remain after cooling and, in fact, proper choice of ingredients will allow the preparation of adhesive compositions which, after activation to release the liquid plasticizer and subsequent cooling to room temperature, will remain tacky for an indefinitely long period of time in a manner similar to conventional pressure sensitive type adhesives. This effect has not been obtained with the compositions of Perry since to achieve a degree of tackiness at room temperature to be considered pressure sensitive it is essential that such compositions contain solid crystalline plasticizer in major proportions with the result that recrystallization occurs after a period of time to yield a dry non-tacky film, that is, the activated adhesive compositions of Perry tend to revert to their original unactivated state. If the plasticizer is volatile, the effects of the merging may last only temporarily, and after its evaporation, the adhesive composition may acquire quite different properties including an activation temperature higher than that initially required when the plasticizer was present. These are effects that cannot be obtained with the compositions of Perry and are examples of the greater versatility of the compositions provided by this invention.

As related to the actual uses to which adhesives are put, the invention provides an adhesive composition in the form of a dry, non-tacky film, such as the adhesive film on a gummed label, gummed tape, envelope flap, box panel or the like, which when heated to an initial activation temperature becomes adhesively tacky or viscid or of other similar adhesive properties, and these properties will remain in the film upon subsequent cooling to a temperature lower than the initial activation temperature. The adhesive properties acquired on initial activation may in fact remain even upon cooling of the film to room temperature or below, and thereby provide what is in effect an ordinary pressure sensitive adhesive. Thus, after initial activation, the source of heat need not be maintained and the activated film may be applied during a considerable period of time after initial activation.

In this connection it should be borne in mind that a gum, resin, or other polymeric material of the type normally employed in an adhesive will exist as a dry, non-tacky solid at a sufficiently low temperature at which no adhesive characteristics are exhibited. As the temperature is raised, the material will soften, or perhaps liquify, and it may then be applied to a suitable surface to which it will adhere. Upon subsequent cooling the material will revert to its original solid state at a temperature quite close to that at which softening occurred and subsequent heating will soften the material again at about the same temperature. If now, the same material be combined with a compatible material in the nature of a plasticizer, the transition from solid to softened condition will ordinarily take place at a lower temperature. Thus, when the plasticized mixture is heated to such lower activation temperatures it becomes softened, and upon cooling it will begin to harden at about the same temperature. A subsequent heating and cooling will produce generally the same results.

In the compositions of the present invention, the potentially adhesive composition in its initial state, although containing plasticizer, is not plasticized since the plasticizer is in a physically distinct phase and is not combined with the polymeric material. When heated, activation occurs when the latent plasticizer complex dissociates and the plasticizer and polymeric material combine, and thereafter the adhesive is a plasticized mixture having a lower transition temperature between its solid and softened states.

The invention will accordingly be seen to provide adhesive compositions of various characteristics, depending upon the nature and effect of the particular plasticizer on the particular polymeric material. It should here be noted that as to the plasticizers and polymeric materials themselves, the invention utilizes in general materials whose effect in combination are either known or easily determined without the exercise of an inventive act. The invention is in this sense not based on adhesive formulations, but rather on a novel manner of combining the components of essentially conventional adhesives, making use of a class of materials by which a liquid plasticizer may be incorporated in the adhesive and held inactive until released by heat or solvent.

Plasticizer-containing complexes which are particularly suitable for use in this invention are the so-called inclusion compounds of the general kind originally discovered by Bengen (German patent application OZ12438, March 18, 1940) and more recently described by Cramer, Frederick, Einschlussverbindugen (published by Sprinks-Verlag, Berlin, 1954) and by Swern, Urea and Thiourea Complexes in Separating Organic Compounds, Ind. and Eng. Chem. 47, 216 (February 1955). The complexes of urea and related compounds provide an effective means of combining a great variety of normally liquid organic materials, many of which are useful plasticizers for adhesive materials, into a solid crystalline structure which is inert and stable under ordinary atmospheric conditions but dissociable on heating to moderate temperatures to yield the plasticizer in active form. Materials other than urea and thiourea are also known to combine with organic materials to form stable crystal complexes, and where such may be formed with suitable plasticizers the resulting complex may be considered as the full equivalent of the urea or thiourea complex. Since, however, urea and thiourea are relatively inexpensive, otherwise well suited for complexing purposes, and of maximum versatility in being able to form complexes with an extremely large number of solvent-type materials, a detailed laboratory investigation of other possible types of complex forming materials has not been undertaken to the point where precise formulations can be set forth, since such work is seen only as a duplication of work already completed.

It is however believed to be fully within the capabilities of those skilled in the art to make use of other types of solvent-containing complexes in the manner disclosed herein without the exercize of inventive skills.

Plasticizer-containing complexes suitable for use in this invention are those that are stable under conditions generally encountered in the manufacture, storage, handling, and shipment of adhesive compositions and articles carrying them, and these conditions are referred to in this specification and in the appended claims by the term "normal." The term is not used however in an absolute sense, but rather with reference to the normal range of conditions one might expect to prevail under actual conditions of use, and to the fact that the complex will dissociate at some higher yet practically attainable temperature.

In any case, suitable plasticizer-containing complexes from the class of urea and thiourea inclusion compounds may be readily selected on the basis of the suitability of the plasticizer component for the particular adhesive material, and on the basis of its characteristics of stability, inertness, and dissociability which, if not already known, may be readily determined by routine experimentation.

Embodiments of this invention may include as polymeric material any of the known gums, normally solid resins, or other polymeric materials capable of becoming viscid or tacky through the action of heat and plasticizer commonly used in adhesives, as well as materials which may in the future be known as having similar physical characteristics. Such materials are referred to herein and in the appended claims as potentially viscid polymeric material. Any liquid plasticizer which forms a suitable complex with urea may also be used, if it is otherwise compatible with the particular polymeric material. In this connection, it is contemplated that for any polymeric material only those materials known as plasticizers, or determined to be plasticizers through appropriate tests, would be selected. The ability of a particular plasticizer to combine to form a stable complex with urea or thiourea may be already known or it may be readily determined by simple routine experimentation.

The compositions of this invention are prepared by first forming the latent plasticizer component, preferably in the form of a finely-divided solid, which is then combined with the polymeric material in an appropriate medium and applied to the proper surface. The polymeric material may be dissolved in a solvent which is not a solvent for the latent plasticizer, or alternatively the polymeric material may be incorporated as solid particles with the particles of latent plasticizer in a suitable binder.

The relative proportions of plasticizer and polymeric material may vary considerably depending on the properties desired and nature of the materials, but as a practical matter, formulations prepared in accordance with this invention intended to make full use of the advantages it provides will include sufficient plasticizer that the adhesive film, upon initial activation will remain usefully adhesive at temperatures at least 10° F. lower than the initial activation temperature. Urea complexes of plasticizers will typically contain 2–3.5 parts of urea per part of plasticizer, and the urea will also be present in the adhesive composition, but apparently it has no serious detrimental effect.

The examples which follow describe in detail several compositions representative of this invention. In each case the latent plasticizer is prepared by first forming a saturated solution of urea (or thiourea) in methanol, approximately 18 grams of urea dissolved in 82 grams of methanol at room temperature, and then about 5 grams of the plasticizer are added while the solution is agitated. Agitation is continued until a precipitate is formed, which generally occurs immediately following the addition of the plasticizer. The precipitate, which is the latent plasticizer urea complex, is filtered from the mixture and washed thoroughly with toluene, a non-solvent for urea but solvent for plasticizers.

The adhesive compositions containing latent plasticizer were each prepared from a polymeric material and an inclusion complex containing a suitable compatible plasticizer, by the following technique: the polymeric material was first dissolved in a solvent which is a non-solvent for the urea (or thiourea), generally a non-polar solvent. After the solution has been formed, an amount of the latent plasticizer inclusion compound is added so that the desired ratio of included plasticizer to polymeric material is present. If necessary, additional solvent for the polymeric material may be added to impart the required viscosity. The mixture is then wet ground by ball milling for about 8 hours to form a fine coatable suspension of the inclusion compound in a solution of the polymeric material. A sheet of 28-pound paper, (basis 24″ x 36″—500 sheets), commonly referred to as a "fine" printing sheet, composed of about 35 percent kraft and 65 percent sulphite paper fibers and having a coating of a titanium clay in a suitable binder on one surface (e.g. Fracote, product of Fraser Paper Company) is coated with the above suspension to a residual coating weight of about 25 pounds per 3000 square feet. For purposes of obtaining specimens for testing, the suspension is applied to the singly coated side of the base paper to prevent excessive penetration of the ingredients of the suspension into the sheet. The coating is allowed to dry thoroughly for 48 hours at room temperature to ensure complete removal of solvent.

The adhesive compositions described in the examples were tested to determine the "minimum activation temperature," the "initial adhesive temperature," and the "subsequent adhesive temperature," and the blocking characteristics which are reported as the "maximum free point."

"Minimum activation temperature" is the temperature at which slight adhesive characteristics first appear under given standard conditions. In the examples, the minimum activation temperature was determined in the following manner:

A coated sheet, as described above, is cut into strip specimens each ¼ inch wide by about 2 inches long. One strip specimen is placed coated side down on a single sheet of 25-pound Glassine (basis: 24″ x 36″—500 sheets). A section of cork having a bottom face ¼ inch wide by at least ¼ inch long is placed on top of the strip specimen in such a manner that the contact area between the cork and strip specimen is ¼ inch by ¼ inch. The ends of the strip specimen and glassine sheet are fastened to the side faces of the cork so that the areas in contact with the bottom face are smoothly in position. This assembly is then placed with its bottom face in contact with a flat heated surface whose temperature is maintained within plus or minus 1° F. and a 500-gram weight is placed on the top face of the assembly. The weighted contact with the heated surface is maintained for a period of five minutes whereupon the strip specimen and glassine sheet are separated. The temperature of the heated surface is initially selected so that no adhesive bond between the strip specimen and glassine sheet is apparent. Others of the same series of strip specimens are similarly exposed to the heated surface at temperatures varying upwards by 5° F. increments. The lowest temperature at which a substantial bond between the strip specimen and glassine sheet is observed is taken as the "minimum activation temperature."

The "initial adhesive temperature" is the lowest temperature at which strong useful adhesive conditions, under sufficient pressure, are obtained. Since the pressure may vary with adhesive compositions, we choose for the pressure in determining the "initial adhesive temperature" one which will result in an initial adhesive temperature substantially equal to the "minimum activation temperature." When this pressure is later used to determine the "subsequent adhesive temperature" the difference in the initial and subsequent adhesive temperatures is a fair measure of the latent plasticizing property.

The initial adhesive temperature is determined in the following manner:

Strips of the dried adhesive coated paper described above, cut parallel to the grain of the paper and ¼ inch in width, are superimposed precisely with their adhesive films in contact and their ends overlapping by ½ inch (providing a contact area of ¼″ x ½″). The strips thus positioned are placed on a flat heated surface whose temperature is equal to the minimum activation temperature and is maintained within plus or minus 1° F. and a measured pressure is applied over the ¼″ x ½″ contact area for a period of one minute. The specimen obtained is subjected to a tensile strain in the long direction of a Schopper tensile tester at 70° F. until rupture occurs. If such rupture occurs in the adhesive joint rather than in the paper itself, another specimen is prepared with increased joining pressure. If a paper rupturing bond cannot be obtained at the minimum activation temperature by the application of a reasonable amount of pressure the temperature of the heated surface is increased by 5° F. and specimens are again prepared over the range of applied pressures. This procedure is continued until a paper rupturing adhesive joint is obtained, the temperature resulting in such a joint being the "initial adhesive temperature."

The "subsequent adhesive temperature" is the lowest temperature at which useful adhesive properties appear in a film after initial activation or conversely the lowest temperature to which the film may be safely allowed to cool, following initial activation, without serious loss of adhesiveness. The "subsequent adhesive temperature" is determined in the following manner:

Strips of dried adhesive coated paper, similar to those employed in the determination of the "initial adhesive temperature," are activated by heating to a temperature of 325° F. for 30 seconds and are subsequently cooled to a non-tacky state at 70° F. or lower, if necessary, for 10 minutes. These strips are superimposed in the manner employed in determining the initial adhesive temperature, their respective activated films of adhesive in contact and overlapping by ½ inch, and are placed for one minute on a flat surface at the temperature of non-tack under a pressure equal to that used to finally determine the initial adhesive temperature and the specimen obtained is subjected to a tensile strain in the long direction until rupture occurs. If such rupture occurs in the adhesive joint rather than in the paper, the procedure is repeated at temperatures varying upwards by 5° F. increments, but under the same pressure, until rupture occurs in the paper strip. The lowest temperature sufficient to cause rupture of the paper strip is the "subsequent adhesive temperature."

Blocking tests were also made to determine the tendency of adhesive compositions prepared according to this invention to adhere to an adjacent sheet when in contact for long periods of time, as during storage. Such a tendency is obviously undesirable, and the temperature at which blocking will occur is preferably high so as to minimize the danger of blocking during storage and transportation.

Coated sheets of paper prepared as described above were held with the adhesive film in contact with the uncoated side of a second sheet for one hour under a pressure of 10 pounds/square inch, at temperature varying by intervals of 5° F. The highest temperature at which the sheets did not stick together sufficiently to prevent separation without tearing or adhesive transfer to the adjacent sheet is reported as the "maximum free point." Determinations were made for unactivated sheets and for sheets which had been activated by heating to 325° F. for 30 seconds followed by cooling to a non-tacky state at 70° F. or lower for 10 minutes.

The significant temperatures determined for each formulation described in the examples is set forth as indicative of the nature and characteristics of the various compositions, and should not be taken as describing the temperatures or pressures at which optimum conditions are developed. Activation will ordinarily be at temperatures well above the minimum adhesive temperature, and adhesive bonds of strength greater than that just sufficient to cause the paper employed in the tests to rupture can be developed in most cases. The temperatures given as the "maximum free point" should be taken only as an indication of a failure to block under the conditions of the test and not as an absolute indication that blocking will not occur at that temperature under other conditions.

The following plasticizers have been incorporated into a urea (or thiourea where indicated) inclusion compound to form latent plasticizers. The relative amounts by weight of urea to plasticizers are given under the heading "Ratio of Urea to Plasticizers." In each case the latent

*Table I*

| Type designation | | Ratio of urea to plasticizer |
|---|---|---|
| | DIBASIC ESTERS | |
| a | Dibutyl maleate | 3.06/1 |
| b | Diethylene glycol dipelargonate | 3/1 |
| c | Triethylene glycol dipelargonate | 2.71/1 |
| d | N-octyl N-decyl phthalate | 3.3/1 |
| e | Didodecyl carbonate | 2.5/1 |
| f | N-octyl N-decyl adipate (Adipol ODY) | 3.3/1 |
| g | Di-isodecyl adipate (with thiourea) | 6/1 |
| | MONOBASIC ESTERS | |
| h | Butyl oleate | 3.35/1 |
| i | Butyl stearate | 3.0/1 |
| | ALCOHOLS | |
| j | Lauryl alcohol | 3.05/1 |
| k | Octadecanol | 3.45/1 |
| l | Ocenol | 2.8/1 |

Table I—Continued

| Type designation | | Ratio of urea to plasticizer |
|---|---|---|
| | MERCAPTANS | |
| m | N-octyl mercaptan | 3.2/1 |
| | ETHER ESTERS | |
| n | Butoxy ethyl stearate (KP-23) | 2.9/1 |
| o | Methoxyethyl stearate (Kapsol) | 2.8/1 |
| | TOSYLATES | |
| p | Lauryl tosylate | 2.01/1 |
| q | N-decyltosylate | 3.2/1 |
| | EPOXY TYPE | |
| r | Epoxy resin plasticizer | 2/1 |
| s | Octyl epoxy stearate (Drapex 4.4) | 2.75/1 |
| t | Octyl epoxy stearate (Drapex 3.2) | 2.75/1 |
| u | Octylene oxide | 2.8/1 |
| | ALIPHATICS | |
| v | Lauric acid | 2.75/1 |
| w | Nonanoic acid | 3.2/1 |
| | CARBAMATES | |
| x | Dodecyl carbamate | 3.4/1 |
| | KETONES | |
| y | Stearone | 3.2/1 |
| z | Decanoic acid | | plasticizer was prepared by the procedure described above.

The formulation of adhesive compositions prepared in accordance with this invention are given in the following Table II, by way of representative examples. The following adhesive materials were used, and are identified in Table II by the following designations:

| Type designation | Adhesive | Description |
|---|---|---|
| A | Ethocel N-100 | Ethyl cellulose. |
| B | Parlon S-125 | Chlorinated rubber. |
| C | PS-111 | Polystyrene. |
| D | Gelva C-254-H | Polyvinyl acetate copolymer. |
| E | Acryloid B82 | Acrylic resin. |
| F | Piccolyte S115 | Terpene resin. |
| G | Nevindene R12 | Coumarone-indene resin. |
| H | Plioflex 1006 | Butadiene-styrene copolymer |
| I | Lewisol 40 | Fumaric acid-resin adduct. |
| J | Butyl rubber | Butyl rubber. |

The amounts given are in parts by weight, and the amount of plasticizer is exclusive of the urea (or thiourea) present. In other words, where the plasticizer-urea complex contains 2 parts urea to 1 part plasticizer, 25 parts of plasticizer represents 75 parts of the complex.

In preparing the various adhesive compositions, the resin was first dissolved in toluene and the latent plasticizer was then added. The mixture was ball milled for 8 hours and then applied to the paper sheet as described above.

Table II

| Ex. | Polymeric material | | Plasticizer | | Pressure p.s.i.[4] | Temp., °F. | | | | |
|---|---|---|---|---|---|---|---|---|---|---|
| | | | | | | Adhesive temp. | | Min. act. temp. | Maximum free point | |
| | Type[1] | Parts by weight | Type[2] | Parts by weight[3] | | Init. | Subs. | | Init. | Subs. |
| 1 | A | 25 | h | 75 | 400 | 215 | 160 | 215 | 175 | 120 |
| 2 | A | 50 | h | 50 | 400 | 220 | 120 | 225 | 175 | 120 |
| 3 | A | 75 | h | 25 | 400 | 230 | 150 | 230 | 180 | 125 |
| 4 | A | 25 | r | 75 | 864 | 230 | 115 | 230 | 175 | 100 |
| 5 | A | 50 | r | 50 | 400 | 230 | 110 | 230 | 175 | 100 |
| 6 | A | 75 | r | 25 | 680 | 240 | 165 | 240 | 180 | 120 |
| 7 | A | 35 | o | 65 | 240 | 210 | 160 | 210 | 175 | 100 |
| 8 | A | 50 | o | 50 | 8 | 215 | 140 | 215 | 165 | 100 |
| 9 | A | 75 | o | 25 | 400 | 210 | 155 | 215 | 175 | 130 |
| 10 | A | 25 | z | 75 | 400 | 195 | 140 | 200 | 165 | 130 |
| 11 | A | 50 | z | 50 | 48 | 205 | 115 | 210 | 165 | <72 |
| 12 | A | 75 | z | 25 | 32 | 210 | 180 | 210 | 180 | 130 |
| 13 | A | 25 | f | 75 | 864 | 245 | 150 | 245 | 170 | 100 |
| 14 | A | 50 | f | 50 | 680 | 240 | 85 | 235 | 175 | 72 |
| 15 | A | 75 | f | 25 | 630 | 245 | 120 | 245 | 175 | 120 |
| 16 | A | 25 | n | 75 | 864 | 230 | 120 | 230 | 175 | 130 |
| 17 | A | 50 | n | 50 | 1144 | 230 | 110 | 225 | 165 | 100 |
| 18 | A | 75 | n | 25 | 400 | 240 | 145 | 235 | | |
| 19 | A | 25 | j | 75 | 400 | 215 | 115 | 215 | 165 | 120 |
| 20 | A | 50 | j | 50 | 864 | 215 | 100 | 215 | | |
| 21 | A | 75 | j | 25 | 16 | 225 | 190 | 225 | 180 | 140 |
| 22 | A | 25 | e | 75 | 864 | 220 | 145 | 225 | 145 | 130 |
| 23 | A | 50 | e | 50 | 864 | 205 | 155 | 205 | 150 | 130 |
| 24 | A | 75 | e | 25 | 864 | 210 | 150 | 210 | 150 | 130 |
| 25 | A | 25 | p | 75 | 680 | 215 | 155 | 220 | 180 | 130 |
| 26 | A | 50 | p | 50 | 400 | 220 | 200 | 220 | 180 | 125 |
| 27 | B | 35 | h | 65 | 240 | 230 | <72 | 230 | 150 | <72 |
| 28 | B | 50 | h | 50 | 160 | 220 | <72 | 220 | | |
| 29 | B | 75 | h | 25 | 48 | 220 | 95 | 220 | 185 | <72 |
| 30 | {C / A} | {25 / 5} | o | 75 | 400 | 220 | <72 | 220 | 150 | <72 |
| 31 | {C / A} | {50 / 5} | o | 50 | 32 | 215 | <72 | 215 | 150 | <72 |
| 32 | C | 75 | o | 25 | 32 | 210 | 115 | 210 | 150 | <72 |
| 33 | E | 25 | b | 75 | 864 | 235 | 190 | 240 | 195 | 100 |
| 34 | E | 75 | b | 25 | 2 | 210 | 170 | 205 | 140 | 100 |
| 35 | F | 60 | f | 40 | 400 | 235 | 220 | 230 | 195 | <72 |
| 36 | F | 70 | f | 30 | 400 | 230 | 215 | 230 | | |
| 37 | F | 80 | f | 20 | 80 | 220 | 195 | 220 | 175 | <72 |
| 38 | G | 90 | n | 10 | 8 | 190 | 145 | 190 | 165 | 72 |
| 39 | G | 80 | n | 20 | 32 | 200 | 100 | 205 | 170 | 72 |
| 40 | G | 85 | n | 15 | 16 | 185 | 125 | 190 | 165 | <72 |
| 41 | {G / H} | {10 / 10} | b | 80 | 864 | 240 | 200 | 235 | 130 | <72 |
| 42 | A | 25 | g | 75 | 16 | 320 | 285 | 320 | 235 | 195 |
| 43 | A | 50 | g | 50 | 3 | 325 | 300 | 325 | 235 | 195 |
| 44 | A | 75 | g | 25 | 3 | 325 | 285 | 325 | 235 | 210 |
| 45 | {J / G} | {10 / 10} | i | 80 | 864 | 240 | 215 | 240 | 250 | 155 |
| 46 | I | 65 | o | 35 | 18 | 180 | 170 | 180 | 135 | <72 |
| 47 | I | 75 | o | 25 | 9 | 180 | 150 | 180 | 135 | <72 |
| 48 | I | 85 | o | 15 | 9 | 165 | <72 | 165 | 135 | <72 |

[1] See type designation given in Table I, columns 6 and 7.
[2] See type designation given in Table I, columns 6 and 7.
[3] Excluding urea (or thiourea).
[4] Pressure employed to determine adhesive temperature.

The invention has been described with primary emphasis on its heat activatable properties, but the compositions herein described may also be activated by solvents which are effective to dissolve the latent plasticizer complex and thereby release the plasticizer. A particularly suitable solvent for this purpose consists of a mixture of:

Water _____ 30 grams.
Methanol _____ 221 grams.
Toluene _____ 100 grams.
Citric acid _____ 30 grams (to saturate solution).

This solvent mixture includes solvents for both the urea complex (water) and the resin (toluene), which together appear to improve the rate of activation. The methanol serves as a common solvent for both the water and toluene, providing for their combination, and the citric acid serves to combine with the urea after dissociation of the complex and prevent the plasticizer from again combining with the urea or thiourea. The "adhesive temperature after solvent activation" of selected examples following an initial solvent activation are given in Table III. These results were obtained by moistening the adhesive coated sheets, described above, with the above solvent, then permitting the moisture film to dry to a non-tacky state. The "adhesive temperature" was then determined in the same manner as it is determined following heat activation.

*Table III*

| Example | Adhesive Temp., °F. | |
|---|---|---|
| | Initial | After solvent activation |
| 4 | 230 | 135 |
| 5 | 230 | 130 |
| 6 | 240 | 165 |
| 8 | 215 | 165 |
| 9 | 215 | 165 |
| 13 | 245 | 190 |
| 14 | 240 | 135 |
| 15 | 245 | 135 |
| 16 | 230 | 150 |
| 17 | 230 | 120 |
| 19 | 215 | 155 |
| 20 | 215 | 115 |
| 21 | 225 | 175 |

By reference to Table II, it will be seen that the adhesive temperature after solvent activation may differ from the "subsequent adhesive temperature" as defined herein. Solvent activation may not be as thorough as heat activation, apparently because it does not result in as complete mixing of the resin and plasticizer as when heat is applied or because of recombination of the urea and plasticizer. Wherein reference herein is made to a "subsequent adhesive temperature" it will be understood to refer to the value as determined following heat activation as described above.

Solvent activation of adhesive compositions of this invention depends on the use of solvents to cause dissociation of the latent plasticizer, rather than dissolution of the polymeric material. This stands in marked contrast to solvent activatable adhesives heretofore known, for which a solvent for the particular polymeric material is necessary. Solvents other than those for the polymeric material may therefore be employed to activate the adhesive compositions of this invention.

Although this invention has been described in detail with specific reference to preferred embodiments, it is contemplated that numerous modifications, substitutions, or variations will readily occur to those skilled in the art and familiar with this disclosure and that such may be made without departing from the scope of this invention.

The examples set forth numerous combinations of particular plasticizers and adhesive materials and show how the significant temperatures of the adhesive composition of this invention vary with different specific ingredients.

The examples also show how the characteristics of the compositions vary with different relative proportions of adhesive material and plasticizer. The principles set forth here may also be applied to other plasticizers and adhesive material and to proportions different from those given. Mixtures of plasticizers may be employed, and ingredients in addition to those actually shown may be included as desired.

Having thus disclosed our invention, we claim and desire to secure by Letters Patent:

1. A solid potentially adhesive composition activatable to adhesiveness by heat and capable of providing an adhesive bond between two members, comprising a potentially viscid normally solid thermoplastic polymeric material and a latent plasticizer component uniformly distributed throughout said polymeric material in a phase physically distinct from said polymeric material, said latent plasticizer being a solid crystal complex inclusion compound consisting of a liquid plasticizer for said polymeric material and a carrier compound selected from the class consisting of urea and thiourea, at normal conditions being stable and exhibiting substantially no plasticizing characteristics but dissociable at an elevated temperature to release said liquid plasticizer in active condition for plasticizing said polymeric material, said latent plasticizer component being present in an amount effective to provide after heating a plasticized mixture having a subsequent adhesive temperature at least 10° F. lower than the initial adhesive temperature of said composition before such heating.

2. A solid non-tacky potentially adhesive composition activatable to adhesiveness by heat, comprising a plurality of intimately associated but physically distinct materials, one of said materials being a normally solid potentially viscid thermoplastic polymeric material and another being a latent plasticizer component which is a solid crystal complex inclusion compound consisting of a liquid plasticizer for said polymeric material and a carrier compound selected from the class consisting of urea and thiourea, at normal conditions being stable and exhibiting substantially no plasticizing characteristics but dissociable at an elevated temperature to release said liquid plasticizer in active condition for plasticizing of said polymeric material, said latent plasticizer component being present in an amount effective to provide after heating a plasticized mixture having a subsequent adhesive temperature at least 10° F. lower than the initial adhesive temperature of said composition before such heating.

3. A solid potentially adhesive composition activatable to adhesiveness by heat and capable of providing an adhesive bond between two members, comprising a potentially viscid normally solid thermoplastic polymeric material and a latent plasticizer component uniformly distributed as discrete solid particles throughout said polymeric material in a phase physically distinct from said polymeric material, said latent plasticizer being a solid crystal complex inclusion compound consisting of a liquid plasticizer for said polymeric material and a carrier compound selected from the class consisting of urea and thiourea, at normal conditions being stable and exhibiting substantially no plasticizing characteristics but dissociable at an elevated temperature to release said liquid plasticizer in active condition for plasticizing said polymeric material, said latent plasticizer component being present in an amount effective to provide after heating a plasticized mixture having a subsequent adhesive temperature at least 10° F. lower than the initial adhesive temperature of said composition before such heating.

4. An article having a dry solid film adherent thereto capable, after heat activation, of adhesively bonding said article, said film comprising a plurality of intimately associated but physically distinct materials, one of said materials being a normally solid potentially viscid thermoplastic polymeric material and another being a latent plasticizer component which is a solid crystal complex inclusion compound consisting of a liquid plasticizer for said polymeric material and a carrier compound selected from the class consisting of urea and thiourea, at normal conditions being stable and exhibiting substantially no plasticizing characteristics but dissociable at an elevated temperature to release said liquid plasticizer in active condition for plasticizing said polymeric material, said latent plasticizer component being present uniformly throughout said film as discrete solid particles in an amount effective to provide after heating a plasticized mixture having a subsequent adhesive temperature at least 10° F. lower than the initial adhesive temperature of said composition before such heating.

5. An article having a dry solid film adherent thereto capable, after heat activation, of adhesively bonding said article, said film comprising a potentially viscid normally solid thermoplastic polymeric material and a latent plasticizer component uniformly distributed throughout said polymeric material in a phase physically distinct from said polymeric material, said latent plasticizer being a solid crystal complex inclusion compound consisting of a liquid plasticizer for said polymeric material and a carrier compound selected from the class consisting of urea and thiourea, at normal conditions being stable and exhibiting substantially no plasticizing characteristics but dissociable at an elevated temperature to release said liquid plasticizer in active condition for plasticizing said polymeric material, said latent plasticizer component being present in an amount effective to provide after heating a plasticized mixture having a subsequent adhesive temperature at least 10° F. lower than the initial adhesive temperature of said composition before such heating.

6. An article having a dry solid film adherent thereto capable, after heat activation, of adhesively bonding said article, said film comprising a plurality of intimately associated but physically distinct materials, one of said materials being normally solid potentially viscid thermoplastic polymeric material and another being a latent plasticizer component which is a solid crystal complex inclusion compound consisting of a liquid plasticizer for said polymeric material and a carrier compound selected from the class consisting of urea and thiourea, at normal conditions being stable and exhibiting substantially no plasticizing characteristics but dissociable at an elevated temperature to release said liquid plasticizer in active condition for plasticizing said polymeric material, said latent plasticizer component being present in an amount effective to provide after heating a plasticized mixture having a subsequent adhesive temperature at least 10° F. lower than the initial adhesive temperature of said composition before such heating.

7. A coating composition applicable to a surface to form a heat activatable film comprising a solution comprising a potentially viscid normally solid thermoplastic polymeric material having dispersed therein discrete solid particles of a latent plasticizer comprising a solid crystal complex inclusion compound consisting of a liquid plasticizer for said polymeric material and a carrier compound selected from the class consisting of urea and thiourea, at normal conditions being stable and exhibiting substantially no plasticizing characteristics but dissociable at an elevated temperature to release said liquid plasticizer in active condition in a film formed by said composition for plasticizing said polymeric material, said latent plasticizer component being present in an amount effective to provide after heating a plasticized film having a subsequent adhesive temperature at least 10° F. lower than the initial adhesive temperature of said film before such heating.

8. A coating composition comprising a suspension containing a potentially viscid normally solid thermoplastic polymeric material, and having dispersed therein discrete solid particles of a latent plasticizer, said latent plasticizer being an undissociated solid crystal complex inclusion compound consisting of a liquid plasticizer for said polymeric material and a carrier compound selected from the class consisting of urea and thiourea.

References Cited in the file of this patent

UNITED STATES PATENTS

| | | |
|---|---|---|
| 2,462,029 | Perry | Feb. 15, 1949 |
| 2,579,481 | Fenn | Dec. 25, 1951 |
| 2,760,942 | Oakley | Aug. 28, 1956 |
| 3,010,922 | Kosche | Nov. 28, 1961 |

OTHER REFERENCES

Swern: "Ind. and Eng. Chem.," 47, 216 (1955).
Modern Plastics Encyclopedia, vol. 36, No. 1A (1958), pages 640–653.